United States Patent
Yin et al.

(10) Patent No.: US 10,171,227 B2
(45) Date of Patent: Jan. 1, 2019

(54) METHOD AND APPARATUS FOR CONFIGURING ONU AS IEEE 1588 MASTER CLOCK IN PON

(71) Applicant: Alcatel Lucent, Boulogne-Billancourt (FR)

(72) Inventors: Qin Yin, Shanghai (CN); Xiao Chen, Shanghai (CN); Xili Zhang, Shanghai (CN); Jianhua Zhu, Shanghai (CN)

(73) Assignee: ALCATEL LUCENT, Boulogne Billancourt (FR)

( * ) Notice: Subject to any disclaimer, the term of this patent is extended or adjusted under 35 U.S.C. 154(b) by 268 days.

(21) Appl. No.: 14/894,624

(22) PCT Filed: Jul. 10, 2014

(86) PCT No.: PCT/IB2014/001491
§ 371 (c)(1),
(2) Date: Nov. 30, 2015

(87) PCT Pub. No.: WO2015/004522
PCT Pub. Date: Jan. 15, 2015

(65) Prior Publication Data
US 2016/0112185 A1    Apr. 21, 2016

(30) Foreign Application Priority Data

Jul. 12, 2013    (CN) .......................... 2013 1 0293582

(51) Int. Cl.
*H04L 7/00* (2006.01)
*H04J 3/06* (2006.01)
*H04B 10/27* (2013.01)

(52) U.S. Cl.
CPC ........... *H04L 7/0075* (2013.01); *H04B 10/27* (2013.01); *H04J 3/0655* (2013.01); *H04L 7/0008* (2013.01)

(58) Field of Classification Search
CPC ...... H04J 3/0635–3/0644; H04J 3/0658; H04J 3/0685–3/0688; H04L 7/00; H04L 7/0091
See application file for complete search history.

(56) References Cited

U.S. PATENT DOCUMENTS 8,718,482 B1 * 5/2014 Roberts .................. H04B 10/27
398/102
2005/0058118 A1    3/2005 Davis et al.
(Continued)

FOREIGN PATENT DOCUMENTS

| CN | 101795423 A | 8/2010 |
| CN | 102355396 A | 2/2012 |
| EP | 2 372 932 A1 | 10/2011 |
| EP | 2372932 A1 | 10/2011 |

(Continued)

OTHER PUBLICATIONS

International Search Report PCT/ISA/210 for International Application No. PCT/IB2014/001491 dated Jan. 27, 2015.
(Continued)

*Primary Examiner* — Andrew W Chriss
*Assistant Examiner* — Kenan Cehic
(74) *Attorney, Agent, or Firm* — Harness, Dickey & Pierce P.L.C.

(57) ABSTRACT

A method for making IEEE 1588 master clock configuration for an ONU in a PON includes creating a PTP port on a UNI of the ONU, and generating a corresponding PTP port ME for the PTP port to indicate that the UNI is operating in a master clock mode; generating a 1588 master clock configuration data ME based on PTP port MEs of all PTP ports in the ONU, to store profiles of all PTP ports used as master clock devices; and generating a clock data set ME according to the 1588 master clock configure data ME, to indicate clock source information of all PTP ports used as master clock devices.

14 Claims, 4 Drawing Sheets

(56) References Cited

U.S. PATENT DOCUMENTS

| | | | |
|---|---|---|---|
| 2009/0016475 A1* | 1/2009 | Rischar | H04J 3/0697 375/356 |
| 2011/0262133 A1 | 10/2011 | Yuan | |
| 2014/0010244 A1* | 1/2014 | Bui | H04J 3/0697 370/503 |
| 2014/0226984 A1* | 8/2014 | Roberts | H04B 10/27 398/66 |
| 2014/0294021 A1* | 10/2014 | Jobert | H04L 45/00 370/503 |
| 2014/0362872 A1* | 12/2014 | Grenabo | H04J 3/0638 370/507 |
| 2015/0104167 A1* | 4/2015 | Bottari | H04B 10/0775 398/16 |
| 2015/0113174 A1* | 4/2015 | Yang | H04L 69/28 709/248 |
| 2015/0207579 A1* | 7/2015 | Chapman | H04J 3/0667 370/503 |

FOREIGN PATENT DOCUMENTS

| | | |
|---|---|---|
| EP | 2472768 A1 | 7/2012 |
| WO | WO-2005/034568 A1 | 4/2005 |
| WO | WO-2013/191608 A1 | 12/2013 |

OTHER PUBLICATIONS

Geoffrey M. Garner, Using an IEEE 802.1AS Network as a Distributed IEEE 1588 Boundary, Ordinary, or Transparent Clock, Samsung Advenced Institute of Technology, 2010, 1-7.

Kenji Nakanishi, Draft Document of G.epon, NTT, Mitsubishi, Oki, 2012, 1-27.

Richard Goodson, Distributed Boundary and Transparent Clocks, ADTRAN, Calix, Symmetricom, 2010, 1-4.

John C. Eidson et al., IEEE Standard for a Precision Clok Synchronization Protocol for Networked Measurment and Control Systems, Technical Committee on Sensor Technology, 2008, 1-269.

* cited by examiner

METHOD AND APPARATUS FOR CONFIGURING ONU AS IEEE 1588 MASTER CLOCK IN PON

CROSS-REFERENCE TO RELATED APPLICATIONS

This is a National Phase of PCT Patent Application No. PCT/IB2014/001491, filed on Jul. 10, 2014, and claims priority to, Chinese Application No. 201310293582.2, filed Jul. 12, 2013, the contents of each of which are hereby incorporated by reference in their entirety.

TECHNICAL FIELD

The present invention generally relates to the field of wireless communication, and in particular to a method and apparatus for configuring an ONU as an IEEE 1588 master clock in a PON.

BACKGROUND

The passive optical network (PON) refers to an optical network which does not include any electronic devices or electronic power supply in its optical distribution network (ODN). A PON system is mainly consisted of an optical line terminal (OLT) on an office end, optical network units (ONUs) or optical network terminals on user ends, and an ODN between the OLT and the OUNs/ONTs. The ODN only includes passive devices without expensive active electronic devices. The PON is a promising solution because the PON eliminates active devices between the office and the user end so as to enable an easier maintenance, a higher reliability, a lower cost and optical fiber resources saving.

Two main technologies currently used in broadband access in the PON include EPON and GPON. In the description below, the EPON and its derived networks (such as GEPON, 10G-EPON) are collectively called as EPON type networks, while the UPON and its derived networks (such as GPON, XGPON and NGPON2) are collectively called as EPON type networks.

IEEE 1588 PTP is a high precision timing protocol which is widely used in mobile backhaul network for time and frequency synchronization. Nowadays, as one of the mobile backhaul network element, PON system (such as GPON, XGPON and NGPON2) was also supposed to support IEEE 1588 PTP in SO-OC mode. FIG. 1 illustrates a schematic drawing of an IEEE 1588v2 PTP solution in an existing GOPN system. As shown in FIG. 1, first, the OLT at the office end, as an IEEE 1588 slave, receives and terminates IEEE 1588 messages from network side. Then time and clock information will be transferred from the OLT to ONUs via ToD over UPON protocol which is defined in ITU-T G.984.3 Amendment 2. At last, the ONUs/ONTs, as IEEE 1588 masters, re-package the time/clock information (received from PON interface) into 1588 messages and deliver them to UNI interface towards the base stations. There are similar structures in the EPON as that in the GPON.

OMCI which is a configuration transmission channel defined in the GPON standard transmits OMCI messages by establishing private OMCI management channels between the OLT and the OUNs/ONTs, which provides a standard ability to acquire the OUNs/ONTs and also can manage and control the OUNs/ONTs.

In the EPON type networks, the management and maintenance to the OUNs/ONTs by the OLT is done through an OAM protocol defined in the IEEE 802.3ah.

ABBREVIATIONS USED IN THIS APPLICATION

BC Boundary Clock
EPON Ethernet Passive Optical Network
GEPON Gigabit Ethernet Passive Optical Network
10G-EPON 10 Gigabit Ethernet Passive Optical Network
GPON Gigabit Passive Optical Network
IEEE Institute of Electrical and Electronics Engineers
ITU International Telecommunication Union
L2 Level 2
L3 Level 3
ME Managed Entity
NGPON2 Next Generation Passive Optical Network-type 2
OAM Operation, Administration and Maintenance
OLT Optical Line Terminal
OMCI Optical Network Unit Management and Control Interface
ONU Optical Network Unit
ONT Optical Network Terminal
OSI Open System Interconnection
PON Passive Optical Network
PPTP Physical Path Termination Point
PTP Precision Time Protocol
SO-OC Slave Only Ordinary Clock
TCI Tag Control Information
TCP Transmission Control Protocol
ToD Time of Day
UDP User Datagram Protocol
UNI User Network Interface
VLAN Virtual Local Area Network
XGPON 10 Gigabit-capable Passive Optic Network

SUMMARY

However, as the lost piece of the IEEE 1588v2 end-to-end solution over GPON, there is no way to configure the IEEE1588 master clock in OUNs/ONTs via the OMCI management channel because it is not defined in ITU G.988 (for GPON/XGPON OMCI definition) or any other standard. Similarly in the EPON type networks, there is no way to configure the 1588 master clock in OUNs/ONTs via the OAM protocol or any other protocol.

In view of the above problem, the present invention provides a method and apparatus for configuring an ONU as an IEEE 1588 master clock in a PON system (which includes both the GPON type network and the EPON type network). The core concept is to manage each IEEE 1588 PTP port on the ONU as an IEEE1588v2 master clock device in different scenes by extending the OMCI protocol/OAM protocol.

According to one aspect of the invention, there is provided a method for configuring an ONU as an IEEE 1588 master clock in a PON, comprising: creating a PTP port on a UNI of the ONU, and generating a corresponding PTP port ME for the PTP port to indicate that the UNI is operating in a master clock mode; generating a 1588 master clock configuration data ME based on PTP port MEs of all PTP ports in the ONU, to store profiles of all PTP ports used as master clock devices; and generating a clock data set ME according to the 1588 master clock configuration data ME, to indicate clock source information of all PTP ports used as master clock devices.

According to another aspect of the invention, there is provided an apparatus for configuring an ONU as an IEEE 1588 master clock in a PON, comprising: a PTP port ME creating unit, configured to create a PTP port on a UNI of the ONU and to generate a corresponding PTP port ME for the PTP port to indicate that the UNI is operating in a master clock mode; a 1588 master clock configure data ME generating unit, configured to generate a 1588 master clock configuration data ME based on PTP port MEs of all PTP ports in the ONU, to store profiles of all PTP ports used as master clock devices; and a dock data set ME generating unit, configured to generate a clock data set ME according to the 1588 master clock configuration data ME, to indicate clock source information of all PTP ports used as master clock devices.

Using aspects of the invention, it is possible to manage each IEEE 1588 PTP port in the ONU as an IEEE1588v2 master clock device, so as to enable the IEEE 1588 PTP port in the ONU to run different transport protocols independently (such as L2 Ethernet encapsulation protocol or L3 IP/UDP encapsulation protocol which are defined in IEEE 1588 PTP protocol).

BRIEF DESCRIPTION OF THE DRAWINGS

The present invention will be understood better and other objectives, details, features and advantages of the present invention will become more evident from the description of specific embodiments of the invention given in conjunction with the following figures, wherein.

In all accompanying figures, like or similar reference numbers indicate like, similar or corresponding features or functions.

DETAILED DESCRIPTION

Preferred embodiments of the present invention will now be described in more details in conjunction with accompanying figures. Although preferred embodiments of the present invention are shown in the accompanying figures, it should be understood that the present disclosure can be embodied in various ways but not be limited by the embodiments depicted herein. In contrast, the embodiments are provided herein to make the disclosure more throughout and complete and convey the scope of the present disclosure to those skilled in this art.

Figure 1:
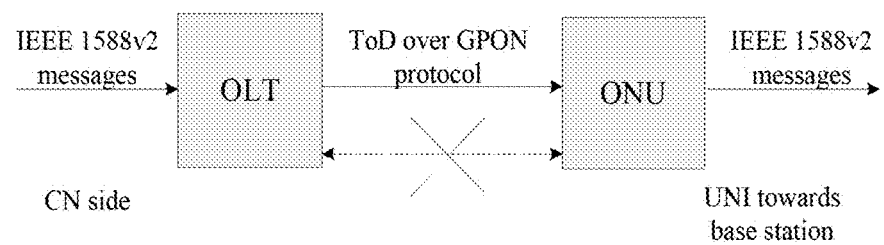
FIG. 1 illustrates a schematic drawing of an IEEE 1588v2 PTP solution in an existing GOPN system.
Figure 2:
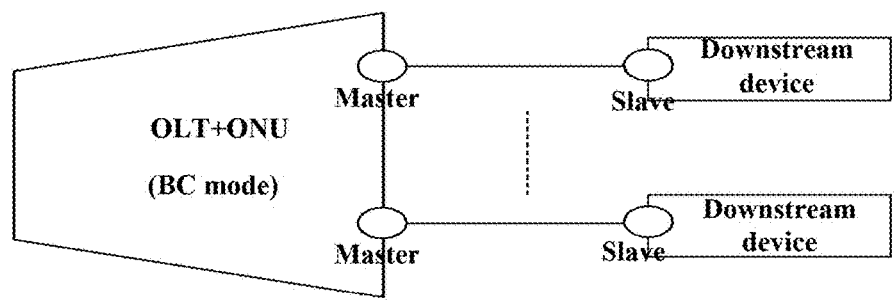
FIG. 2 illustrates a schematic drawing of an end-to-end management model between an ONU and its downstream devices according to an embodiment of the invention.

FIG. 2 illustrates a schematic drawing of an end-to-end management model between an ONU and its downstream devices according to an embodiment of the invention. As shown in FIG. 2, the ONU (in particular, each UNI interface of the ONU) is used as an IEEE1588v2 master clock device to transmit the ToD to its further downstream devices (such as a base station) used as IEEE1588v2 slave clock devices. In the example of FIG. 2, the GPON system works in a binary clock in the end-to-end ToD solution. The invention is not limited thereto, but can be implemented in any clock model.

For example, the schematic drawing of FIG. 2 is described by using the ONU as the master clock device and using its downstream devices as the slave clock devices. However, it can be understood by those skilled in this art that the invention is not limited thereto. The invention can be similarly used in a scene in which the ONT is used as the master clock device and its downstream devices are used as the slave clock devices.

The ONU and the ONT are described specifically in the ITU-T G.988 protocol. For the implementation of the invention, there is no substantial difference between the ONU and the ONT. For simplicity, the following description will be described by using the ONU as an example.

Using the schematic drawing of FIG. 2, the invention focuses on how to manage the IEEE 1588 master clock in the ONU by extending the OMCI protocol.

In the specific description below, the GPON system and the OMCI protocol are described as examples. However, it can be understood by those skilled in this art that the principle of the invention can be easily transplanted to the EPON system by extending the OAM protocol.

As well known by those skilled in this art, various OMCI management entities (MEs) are defined in the ITU-T G.988 protocol. These MEs include MEs which are mandatory for a system to conform to corresponding protocols and MEs required by function sets to be provided by the ONU. As stated above, however, there is no ME defined for managing the IEEE 1588 master clock in the ONU in existing protocols.

Figure 3:
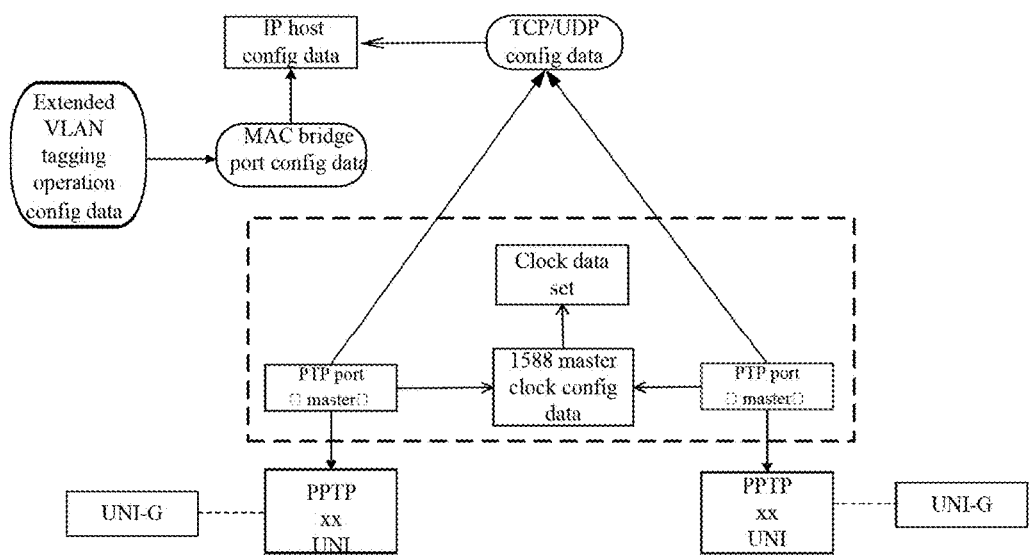
FIG. 3 illustrates a schematic drawing of an ONU configuration model including an OMCI ME according to the invention.

FIG. 3 illustrates a schematic drawing of an ONU configuration model including an OMCI ME according to the invention. As shown in broken line in FIG. 3, in this invention, the IEEE 1588 master clock in the ONU is managed by extending the OMCI protocol to define a PTP port ME, a 1588 master clock configuration data ME and a clock data set ME. It can be understood by those skilled in this art that definitions for the three MEs are only to discriminate the added MEs in terms of their functions but not to limit the invention to the three specific MEs.

Besides, other MEs (such as the UNI-G, the TCP/UDP configuration data, the IP host configuration data, the MAC bridge port configuration data, the Extended VLAN tagging operation configuration data etc.) have been defined in the ITU-T G.988 protocol and will not be described in detail hereinafter.

As shown in FIG. 3, a PTP port is created on the UNI of the ONU and a corresponding PTP port ME is generated to indicate that the UNI is operating in a master clock mode.

A 1588 master clock configuration data ME is generated based on PTP port MEs of all the PTP ports in the ONU to store profiles of all PTP ports used as master clock devices.

A clock data set ME is generated according to the 1588 master clock configuration data ME to indicate clock source information of all PTP ports used as master clock devices.

The 1588 master clock configuration data ME and the clock data set ME are transmitted from the PTP port used as the master clock device to its slave clock devices through IEEE 1588 protocol messages. That is, the 1588 master clock configuration data ME and the clock data set ME determine the operation mode of the IEEE 1588 protocol messages.

In the ONU configuration model shown in FIG. 3, since a corresponding PTP port ME can be generated for each PTP port created on the UNI, each PTP port used as a master clock device can flexibly select its supported IP stack or share IP stack with other services.

The invention further provides the following two specific implementation methods according to whether the PTP port used as the master clock device is transmitting the IEEE 1588 protocol messages on the L2 or the L3.

Figure 4:
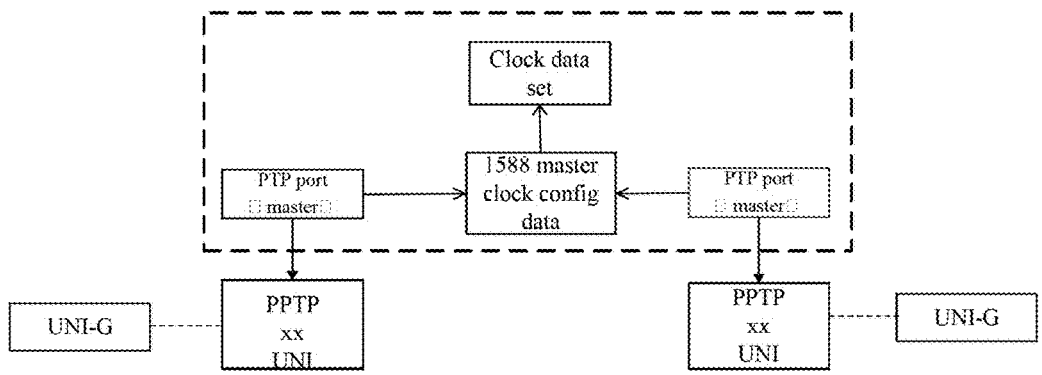
FIG. 4 illustrates a schematic drawing of an L2 OMCI implementation model according to the invention.

FIG. 4 illustrates a schematic drawing of an L2 OMCI implementation model according to the invention.

In the L2 model, the transmission information such as VLAN or Pbit parameters required by the L2 transmission is configured in each PTP port ME used as a master clock device. Herein, the IEEE 1588 protocol messages transmitted by the PTP port used as the master clock device are transmitted in the format of Ethernet frames.

Besides, when slave clock devices operate on different L2 paths, multiple PTP ports can be created on the same UNI to be used as master clock devices and corresponding PTP port MEs can be generated.

Figure 5:
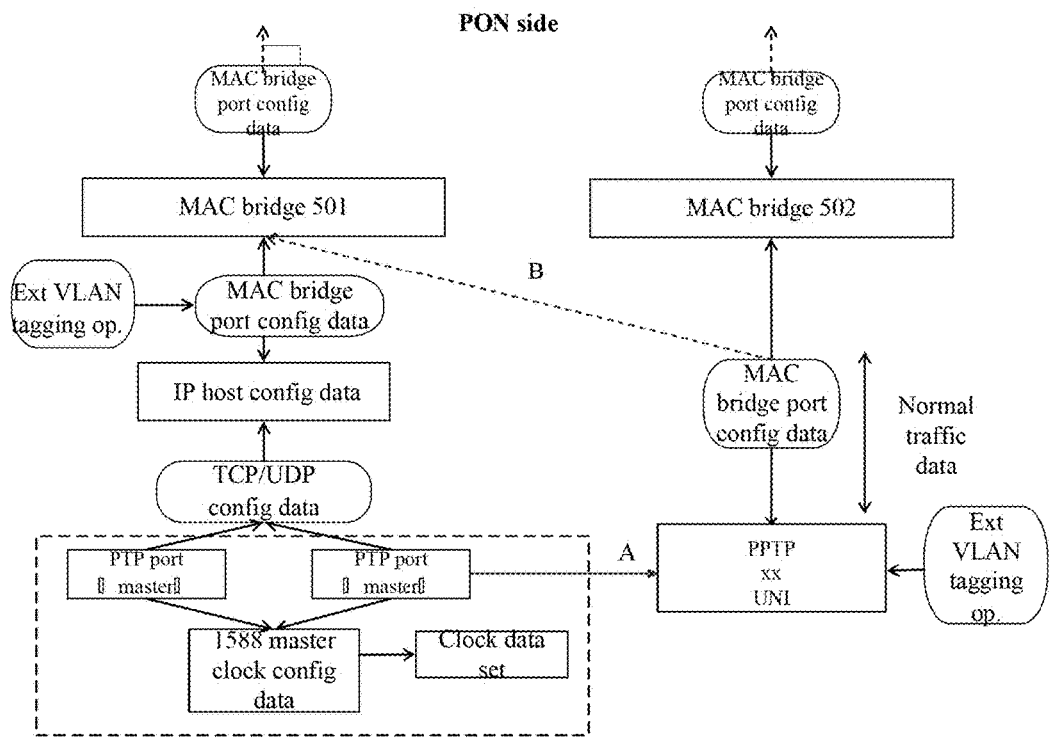
FIG. 5 illustrates a schematic drawing of an L3 OMCI implementation model according to the invention.

FIG. 5 illustrates a schematic drawing of an L3 OMCI implementation model according to the invention.

For the L3 implementation, to conform to the OSI reference model, the IEEE 1588 protocol message should be implemented as an application over the TCP/UDP to share the same IP stack with other applications/services.

Besides, in the L3 model, because the UNI can not only bear IEEE 1588 messages but also bear other normal L2 traffic, the corresponding MAC bridge port needs to be associated with two different MAC bridges. One is a MAC bridge connected to the PON side (such as the MAC bridge 502 shown on the right side in FIG. 5) as previous and the other is a MAC bridge connected to the forward of L3 (such as the MAC bridge 501 shown on the left side in FIG. 5).

In a normal traffic model, the UNI on the ONU only bears the function of transmitting traffic data upward for transmitting normal traffic data from devices on the downstream of the ONU to the PON side, as shown on the right side in FIG. 5.

In the L3 model according to the invention, besides the normal L2 traffic, the UNI can also bear IEEE 1588 protocol messages towards downstream devices. Therefore, it's further illustrated in FIG. 5 (as shown by the arrows A and B in FIG. 5) that when data from the CPU arrived at the MAC bridge 501, the MAC bridge 501 judges whether the data is directed to the PON side or the UNI side according to different applications associated with the data, so as to forward the data accordingly. That is, the L3 model according to the invention makes it possible to downward transmit packets of layers above L3. However, in the existing ITU-T G.988 protocol, there is no ability to actively downward transmit packets of layers above L3. Therefore, this represents another substantial contribution to the prior art by the invention.

To keep the model simple, the UNI corresponding to the MAC bridge port would be implicitly associated with the MAC bridge connected to the forward of L3 via the PTP port explicitly pointing to the UNI. Description is made in FIG. 5 using a 1:MP model as an example. However, the above description is also applicable to a N:MP model, except for sharing of the MAC bridges. The 1:MP model and the N:MP model are defined in related OMCI protocols, therefore they are not described unnecessarily here.

Besides, when slave clock devices operate on different L3 paths, multiple PTP ports can be created on the same UNI to be used as master clock devices and corresponding PTP port MEs can be generated.

In an embodiment, one PTP port used as the master clock device may be associated with multiple slave clock devices concurrently.

In an embodiment, the 1588 master clock configuration data ME may include at least one of the following items:
ME ID, which is an identification of the 1588 master clock configuration data ME in the ONU;
Clock data set pointer, which is configured to point to a clock data set ME;
PTP version, which is configured to indicate the version of the PTP protocol and can be set to be IEEE 1588v2 PTP by default, for example;
step mode, which may indicate one step clock or two step clock corresponding to different timestamp accuracy;
Delay mechanism, which includes, for example, end-to-end (e2e) mechanism, point-to-point (p2p) mechanism, disable etc;
Interval of synchronization message;
Interval of delay message;
Interval of pdelay message (see IEEE 1588 protocol for more information on the pdelay message); and
Interval of announce message.

In an embodiment, the PTP port ME (master clock device) may include at least one of the following items:
ME ID, which is ID of an ME instance;
UNI pointer, which is PPTPxxxUNI;
Admin, which indicates enabling/disabling IEEE 1588 output;
Master pointer, which refers to IEEE 1588 master configuration data ME to inherit the clock parameters, and which also identifies the PTP port role is a master;
Transmission protocol including protocols such as IPv4, IPv6, 802.3, etc.;
TCP/UDP pointer;
Transmission mode; which may be unicast, multicast, or mixed;
TCI, which indicates VLAN+pbit when 802.3 is configured, indicates 0xffff if it is null and indicates untagged frames if it is 0.
peer address table; which specifies the peer addresses in case of unicast transmission mode. Here, when it is associated with the 1588 master clock configuration data ME, the peers would be slave roles, and which includes
address type, which may be in form of Ipv4, Ipv6, or 802.3;
address.

In an embodiment, the clock data set ME may include at least one of the following items:
ME ID, which refers to a clock source in ONU from OLT;
Domain;
Upstream clock class;
Upstream clock accuracy;
Upstream clock priority1;
Upstream clock priority2; and
An alarm, which is defined if ONU could NOT sync with upstream clock.

According to one embodiment of the invention, the 1588 master clock configuration data ME, the lock data set ME and the PTP port ME are all generated by the OLT. However, the invention is not limited thereto since those MEs can also be generated by the ONU/ONT itself or by any other elements in the ODN.

Figure 6:
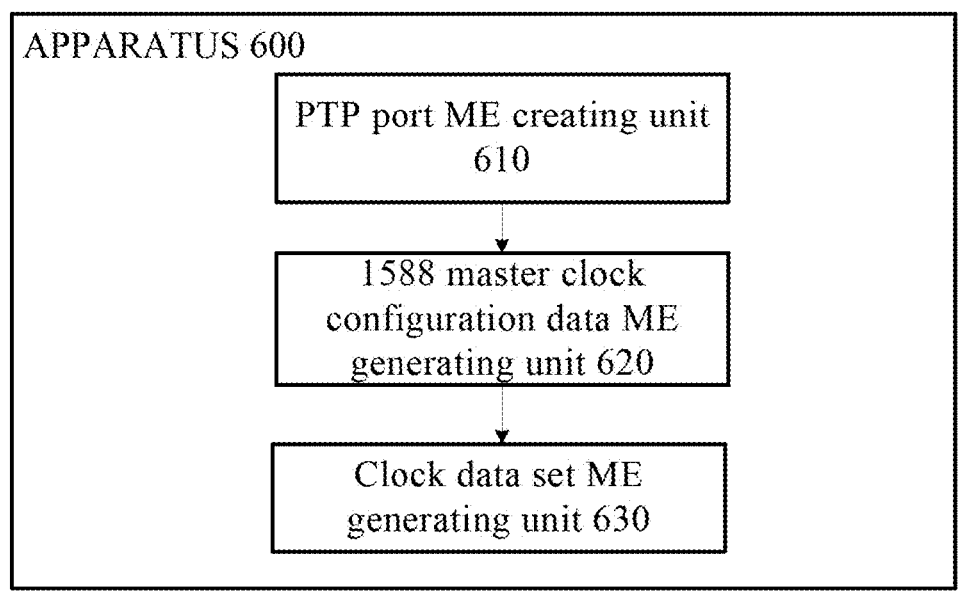
FIG. 6 illustrates a block diagram of an apparatus for configuring an ONU through OMCI protocol messages in a PON according to the invention.

FIG. 6 illustrates a block diagram of an apparatus 600 for making IEEE 1588 master clock configuration for an ONU in a PON according to the invention. For example, the apparatus 600 can be implemented in or by the OLT and configure the ONU through OMCI protocol messages.

The apparatus 600 includes a precision time protocol (PTP) port management entity (ME) creating unit 610 configured to create a PTP port on a UNI of the ONU, and generate a corresponding PTP port ME for the PTP port to indicate that the UNI is operating in a master clock mode.

The apparatus 600 further includes a 1588 master clock configuration data ME generating unit 620 configured to generate a 1588 master clock configuration data ME based on PTP port MEs of all PTP ports in the ONU, to store profiles of all PTP ports used as master clock devices.

The apparatus 600 further includes a clock data set ME generating unit 630 configured to generate a clock data set ME according to the 1588 master clock configuration data ME, to indicate clock source information of all PTP ports used as master clock devices.

Preferably, the apparatus 600 further includes a transmitting unit (not shown in the figure) configured to transmit the 1588 master clock configuration data ME and the clock data set ME from the PTP port used as the master clock device to slave clock devices through IEEE 1588 protocol messages.

Preferably, the PTP port ME creating unit 610 is further configured to create a PTP port ME further comprising the transmission information required by an L2 transmission when the IEEE 1588 protocol messages are implemented on the L2.

Preferably, the transmission information required by the L2 transmission comprises a VLAN parameter and a Pbit parameter.

Preferably, the IEEE 1588 protocol messages are implemented as an application over TCP/UDP when they are implemented on the L3.

Preferably, when the IEEE 1588 protocol messages are implemented on the L3, a MAC bridge port corresponding to the UNI on the ONU not only can be connected to a MAC bridge on the PON side to transmit traffic data to the network side, but also can be connected to a bridge on the forward of the L3 to transmit packets of layers above L3 to downstream devices.

The present invention introduces the IEEE 1588 master clock device into the GPON ONU for the first time and supports the IEEE 1588 PTP protocol used as an end-to-end solution. Using aspects of the invention, it's possible to manage each IEEE 1588 PTP port on the ONU as an IEEE1588v2 master clock device, to enable each IEEE 1588 PTP port on the ONU to run different transport protocols independently (such as L2 Ethernet encapsulation protocol or L3 IP/UDP encapsulation protocol defined in the IEEE 1588 PTP protocol). In the L3 mode, the IEEE1588 masters can share the standard IP interface with other services running on the same ONU.

In one or more exemplary designs, the functions of the present application may be implemented using hardware, software, firmware, or any combinations thereof. In the case of implementation with software, the functions may be stored on a computer readable medium as one or more instructions or codes, or transmitted as one or more instructions or codes on the computer readable medium. The computer readable medium comprises a computer storage medium and a communication medium. The communication medium includes any medium that facilitates transmission of the computer program from one place to another. The storage medium may be any available medium accessible to a general or specific computer. The computer-readable medium may include, for example, but not limited to, RAM, ROM, EEPROM, CD-ROM or other optical disc storage devices, magnetic disk storage devices, or other magnetic storage devices, or any other medium that carries or stores desired program code means in a manner of instructions or data structures accessible by a general or specific computer or a general or specific processor. Furthermore, any connection may also be considered as a computer-readable medium. For example, if software is transmitted from a website, server or other remote source using a co-axial cable, an optical cable, a twisted pair wire, a digital subscriber line (DSL), or radio technologies such as infrared, radio or microwave, then the co-axial cable, optical cable, twisted pair wire, digital subscriber line (DSL), or radio technologies such as infrared, radio or microwave are also covered by the definition of medium.

The various illustrative logical blocks, modules, and circuits described in connection with the disclosure herein may be implemented or performed with a general-purpose processor, a digital signal processor (DSP), an application specific integrated circuit (ASIC), afield programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any normal processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, hut such implementation decisions should not be interpreted as causing a departure from the scope of the present disclosure.

The above depiction of the present disclosure is to enable any of those skilled in the art to implement or use the present invention. For those skilled in the art, various modifications of the present disclosure are obvious, and the general principle defined herein may also be applied to other transformations without departing from the spirit and protection scope of the present invention. Thus, the present invention is not limited to the examples and designs as described herein, but should be consistent with the broadest scope of the principle and novel characteristics of the present disclosure.

We claim:

1. A method for making Institute of Electrical and Electronics Engineers (IEEE) 1588 protocol master clock configuration for an optical network unit (ONU) in a passive optical network (PON), said method comprising:

creating a precision time protocol (PIP) port on a user network interface (UNI) of the ONU, and generating a corresponding PTP port management entity (ME) for the PTP port to indicate that the UNI is operating in a master clock mode;

generating an IEEE 1588 protocol master clock configuration data ME, based on PTP port MEs of all PTP ports in the ONU, to store profiles of all PTP ports used as master clock devices;

generating a clock data set ME, according to the IEEE 1588 protocol master clock configuration data ME, to indicate clock source information of all the PTP ports used as the master clock devices; and transmitting the IEEE 1588 protocol master clock configuration data ME and the clock data set ME from a PTP port used as a master clock device to corresponding slave clock devices using IEEE 1588 protocol messages.

2. The method of claim 1, wherein the PTP port ME comprises transmission information required by a level 2 (L2) transmission when the IEEE 1588 protocol messages are implemented on the L2.

3. The method of claim 2, wherein the transmission information required by the L2 transmission comprises a virtual local area network (VLAN) parameter and a Pbit parameter.

4. The method of claim 1, wherein the IEEE 1588 protocol messages are implemented as an application over TCP/UDP when the IEEE 1588 protocol messages are implemented on level 3 (L3).

5. The method of claim 1, wherein when the IEEE 1588 protocol messages are implemented on level 3 (L3), a MAC bridge port corresponding to the UNI on the ONU not only can be connected to a MAC bridge on a PON side to transmit traffic data to a network side, but also can be connected to a bridge on forward of the L3 to transmit packets of layers above L3 to downstream devices.

6. The method of claim 1, wherein the PON is a gigabit passive optical network (GPON) and the IEEE 1588 protocol master clock configuration for the ONU is realized using optical network unit management and control interface (OMCI) protocol messages.

7. The method of claim 1, wherein the PON is an Ethernet passive optical network (EPON) and the IEEE 1588 protocol master clock configuration for the ONU is realized using operation, administration, and maintenance (OAM) protocol messages.

8. An apparatus for making Institute of Electrical and Electronics Engineers (IEEE) 1588 protocol master clock configuration for an optical network unit (ONU) in a passive optical network (PON), said apparatus comprising:
a memory configured to store computer-readable instructions; and
a processor configured to execute said computer-readable instructions to, create a precision time protocol (PTP) port on a user network interface (UNI) of the ONU, and generate a corresponding PTP port management entity (ME) for the PTP port to indicate that the UNI is operating in a master clock mode;

generate an IEEE 1588 protocol master clock configuration data ME, based on PTP port MEs of all PTP ports in the ONU, to store profiles of all PTP ports used as master clock devices;

generate a clock data set ME, according to the IEEE 1588 protocol master clock configuration data ME, to indicate clock source information of all the PTP ports used as the master clock devices; and transmit the IEEE 1588 protocol master clock configuration data ME and the clock data set ME from a PTP port used as a master clock device to corresponding slave clock devices using IEEE 1588 protocol messages.

9. The apparatus of claim 8, wherein said processor is further configured to execute said computer-readable instructions to create a PTP port ME comprising transmission information required by a level 2 (L2) transmission when the IEEE 1588 protocol messages are implemented on the L2.

10. The apparatus of claim 9, wherein the transmission information required by the L2 transmission comprises a virtual local area network (VLAN) parameter and a Pbit parameter.

11. The apparatus of claim 8, wherein the IEEE 1588 protocol messages are implemented as an application over TCP/UDP when the IEEE 1588 protocol messages are implemented on level 3 (L3).

12. The apparatus of claim 8, wherein when the IEEE 1588 protocol messages are implemented on level 3 (L3), a MAC bridge port corresponding to the UNI on the ONU not only can be connected to a MAC bridge on a PON side to transmit traffic data to a network side, but also can be connected to a bridge on forward of the L3 to transmit packets of layers above L3 to downstream devices.

13. The apparatus of claim 8, wherein the PON is a gigabit passive optical network (GPON) and the IEEE 1588 protocol master clock configuration for the ONU is realized using optical network unit management and control interface (OMCI) protocol messages.

14. The apparatus of claim 8, wherein the PON is an Ethernet passive optical network (EPON) and the IEEE 1588 protocol master clock configuration for the ONU is realized using operation, administration, and maintenance (OAM) protocol messages.

* * * * *